United States Patent [19]
Casey

[11] 3,940,048
[45] Feb. 24, 1976

[54] DEVICE FOR BACKING BUTT-WELDS BETWEEN TUBES
[75] Inventor: James H. Casey, Roseville, Minn.
[73] Assignee: Minnesota Mining and Manufacturing Company, St. Paul, Minn.
[22] Filed: Jan. 21, 1975
[21] Appl. No.: 542,713

[52] U.S. Cl. ............................. 228/50; 228/216
[51] Int. Cl.² .......................................... B23K 5/22
[58] Field of Search ............... 228/50, 49, 57, 216; 29/272, 200 P

[56] References Cited
UNITED STATES PATENTS

| | | | |
|---|---|---|---|
| 478,024 | 6/1892 | Rose | 29/272 |
| 2,472,523 | 6/1949 | Dillon | 228/50 |
| 3,266,820 | 8/1966 | Leborgne et al. | 228/50 |
| 3,806,020 | 4/1974 | Howell | 228/2.5 |

Primary Examiner—Al Lawrence Smith
Assistant Examiner—Margaret Joyce
Attorney, Agent, or Firm—Alexander, Sell, Steldt & DeLaHunt

[57] ABSTRACT

A device used during fusion butt-welding between the ends of tubes to form a backing for the weld inside the tubes. The device comprises a thin flexible metal support strip having end portions which are overlapped to provide an arcuate outer peripheral surface, means guiding the overlapping end portions for relative longitudinal sliding movement to change the peripheral circumference of the support strip, and means for biasing the end portions in a direction to increase the peripheral circumference of the device. For use, the circumference of the support strip is decreased in opposition to the biasing means, and a backing strip of refractory material is secured on the periphery of the support strip. Next the device is positioned with the backing strip adjacent the inner surfaces of and bridging the ends of the tubes to be welded. The device is activated so that the biasing for the support strip will press the backing strip into engagement with the tubes, and the tubes are ready for welding.

6 Claims, 7 Drawing Figures

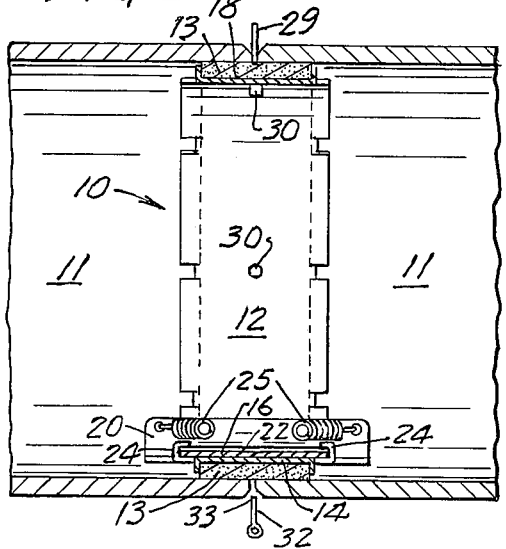
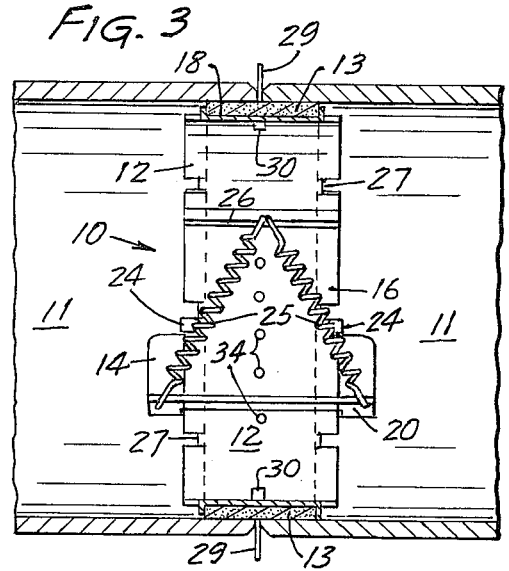
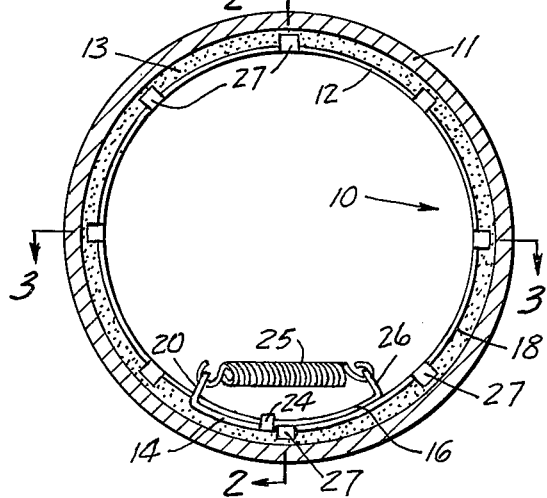
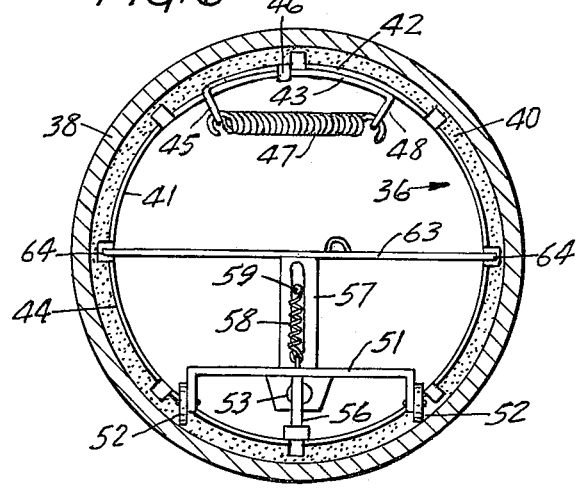
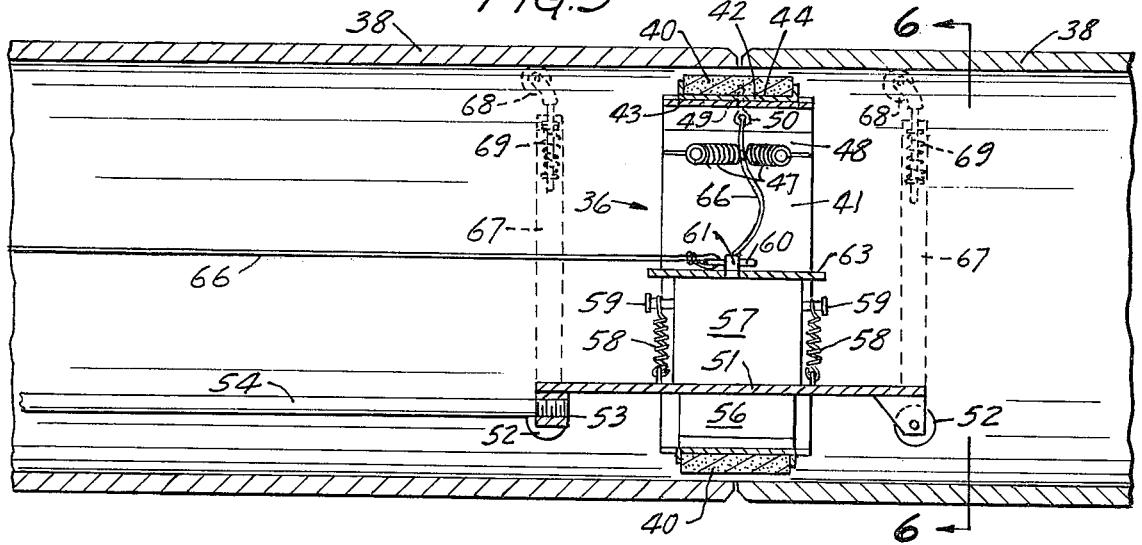

DEVICE FOR BACKING BUTT-WELDS BETWEEN TUBES

BACKGROUND OF THE INVENTION

1. Field of the Invention

This invention relates to devices which, during fusion butt-welding between the ends of tubes, are used to provide a backing for the weld inside the tubes.

2. Description of the Prior Art

During fusion butt-welding between the ends of two tubes it is often necessary or desirable to provide a backing around the inner surfaces of the tubes adjacent and bridging their butted ends to dam the molten metal caused by the welding process. An efficient backing means can form an inner surface on the weld which requires little if any cleaning or finishing to provide a smooth inner surface between the joined tubes.

One type of prior art device for providing such a backing comprises a plurality of firm backing members (typically arcuate copper faced bars) and means for moving the backing members from a release position spaced from the inner surfaces of the tubes, to an engaged position with the backing members forcefully pressed against the inner surfaces of the tubes to be butt-welded. Such devices are suggested in U.S. Pat. Nos. 2,413,103; 2,987,022; 3,369,725; 3,498,518; 3,741,457; and 3,806,020. Typically these devices are quite expensive and do not provide as high a degree of adjustability to accommodate tubes of various inside diameters (e.g., pipe of the same nominal size but of different schedule numbers) or tubes which are out of round. The rigid backing members will not conform to rough inner surfaces so that surface irregularities may space the outer surface of one or more of the backing members from the inner surface of the tubes and allow excessive intrusion of the molten weld material into the joined tubes. Also the backing members occasionally adhere to the weld which interferes with the removal of the device.

It is also well known in the prior art to use a steel ring to provide a backing for fusion butt-welds between the ends of cylindrical tubes. The steel ring is selected to have an outside diameter of about the same size as the inside diameter of the tubes, and a sufficient peripheral width to bridge between the ends of the tubes. The molten weld material adheres to the ring, however, and removal of such a ring, if necessary, requires grinding it out of the pipe, which is expensive and time consuming.

U.S. Pat. No. 3,378,852 teaches using a strip of a flexible, deformable, refractory material comprising inorganic particles bound together with a flexible organic binder as a backing for fusion butt-welds. This refractory material provides an effective and efficient backing, however, applying the refractory material through the use of an adhesive coated strip, as taught in that patent, is not always possible or as convenient as may be desired for applying the refractory material around the inner surfaces of butted tubes.

U.S. Pat. Nos. 2,792,626 and 3,460,736 suggest devices for pressing a strip of backing material into engagement with the inner surfaces of two butted tubes to be butt welded. These devices, however, do not provide the degree of adjustability required for tubes of various sizes. Also they do not provide the proper type of support for the friable refractory material taught in U.S. Pat. No. 3,378,852 while the device is being positioned in butted tubes to be welded, since the device of U.S. Pat. No. 3,460,736 does not maintain an arcuate periphery when not positioned in a tube, and the device of U.S. Pat. No. 2,792,626 maintains the strip of backing material too closely adjacent the inner surface of the tubes to preclude contact therebetween.

SUMMARY OF THE INVENTION

The present invention comprises a device including the flexible, deformable, refractory material taught in U.S. Pat. No. 3,378,852 to provide an inexpensive backing for fusion butt-welds between the ends of tubes. The backing provided is adaptable to a relatively large range of inner tube diameters and will closely conform to the inner surfaces of both round and out of round tubes, even where there is a high degree of surface roughness within the tubes.

The device comprises a thin flexible support strip having overlapped end portions to provide an arcuate outer peripheral surface; means guiding the overlapped end portions for relative longitudinal sliding movement to change the peripheral circumference of the support strip; means for securing the strip of refractory material on the outer periphery of the support strip; and means for positioning the overlapped end portions in a predetermined position relative to each other to afford pressing the strip of refractory material on the periphery of the support strip into engagement with the inner surfaces of butted tubes.

For use, the circumference of the support strip is decreased by sliding the end portions to increase the overlap therebetween, the strip of refractory material is secured on the support strip with its ends overlapped over the overlapped end portions of the support strip, the assembly is positioned inside two butted tubes with the strip of refractory material adjacent and bridging the butted ends thereof, and the circumference of the support strip is increased and positioned to press the strip of refractory material into firm engagement with the inner surfaces of the butted tubes.

The support strip is sufficiently flexible to conform to curvilinear inside diameters of the tubes even if the tubes are oval or somewhat out of round, and the deformable strip of refractory material will form around surface roughness under the influence of the biasing means so that the strip of refractory material fully contacts the inside surfaces of the tubes and limits intrusion of the molten weld material into the tubes.

The means for positioning the end portions of the support strip to press the strip of refractory material into engagement with the internal surfaces of tubes may be provided by a manually operated device such as a bolt or over center device between the end portions. However, where the device is to be used on tubes of various inside diameters, or the feature described in the following paragraph is to be utilized, it is preferable to provide means between the end portions for biasing the end portions to increase the peripheral circumference of the support strip. Such means may be provided by springs or an air cylinder between the end portions.

The support strip may also include a plurality of removable axially centered locating pins projecting radially from its peripheral surface which have a thickness axially of the support strip adapted to provide a predetermined spacing between the ends of tubes to be butt-welded; and a similarly positioned trigger pin having an end removably engageable in aligned openings in the overlapped end portions of the support strip to retain a predetermined overlapped condition therebetween against the influence of the biasing means. With the trigger pin in place, the device can be positioned and supported between the ends of two tubes to be butt-welded via the locating pins. The trigger pin is then pulled causing the biasing means to urge the support strip and strip of refractory material against the inner surface of the tubes in a position bridging their ends. The locating pins then may be removed or incorporated in the weld.

Two alternate embodiments of the device according to the present invention can be used to back a butt-weld between the ends of tubes at a position that cannot be reached to afford manual insertion of the aforementioned embodiment. These alternate embodiments include a cart adapted for moving axially along the inner surfaces of the tubes to be joined; support means supporting the support strip on the cart for movement from a first position with the strip of refractory material spaced from the inner surface of a tube in which the cart is located to afford movement of the cart through the tubes, to a second position with the strip of refractory material pressed against and bridging the inner surfaces of the tubes adjacent the butted ends thereof; and means for moving the support means to the second position.

BRIEF DESCRIPTION OF THE DRAWING

The present invention will be further described with reference to the accompanying drawing wherein like numbers refer to like parts in the several views and wherein:

FIG. 1 is a vertical plan view of a first embodiment of a device according to the present invention including a strip of refractory material being pressed into internal engagement between the butted ends of a pair of tubes to be fusion welded;

FIG. 2 is a sectional view taken approximately along the line 2—2 of FIG. 1;

FIG. 3 is a sectional view taken approximately along the line 3—3 of FIG. 1;

FIG. 5 is a vertical sectional view illustrating the device of FIG. 4 positioned within two tubes between which a fusion butt-weld is to be formed;

FIG. 6 is a sectional view taken approximately along the line 6—6 of FIG. 5.

DESCRIPTION OF THE PREFERRED EMBODIMENTS

Figure 4:
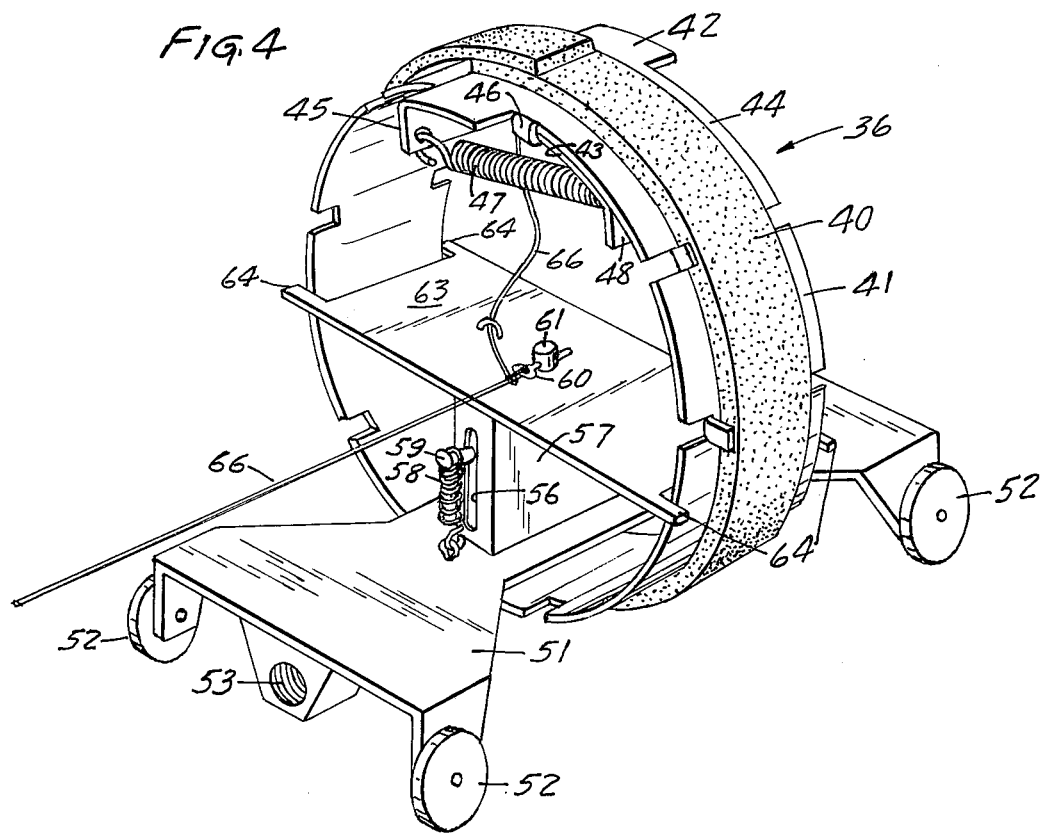
FIG. 4 is a perspective view of a second alternate embodiment of the device according to the present invention.

Referring now to FIGS. 1 through 3 of the drawing, there is illustrated a first embodiment of a device according to the present invention, generally designated by the numeral 10. The device 10 includes a backing strip of deformable, flexible refractory material 13 forcefully positioned against and bridging the inner surfaces of a pair of tubes or pipes 11 in a position to serve as a backing during fusion butt-welding between the ends of the tubes 11.

The preferred refractory material comprises inorganic particles bound together with a flexible organic binder and is that refractory material taught in U.S. Pat. No. 3,378,852, the content whereof is incorporated herein by reference.

The device 10 comprises a thin, flexible support strip 12 (e.g., 2 inch wide 20 gauge full hard stainless steel shim stock) having first and second end portions 14 and 16 respectively which are overlapped to provide an arcuate outer peripheral surface 18 on which the strip of refractory material 13 is supported. The terminal end of the first end portion 14 is wider than the second end portion 16 and carries a flange 20 disposed radially inwardly from the first end portion 14. The flange 20 is formed with a slot 22 through which the second end portion 16 is slidably retained inwardly of the first end portion 14, and which with a pair of tabs 24 on the first end portion 14 bent around the edges of the second end portion 16 provide means for guiding the overlapping first and second end portions 14 and 16 for relative sliding movement. Such sliding movement changes the peripheral circumference of the support strip 12 by changing the amount of overlap between the first and second end portions 14 and 16 thereof.

A pair of springs 25 are tensioned between the flange 20 and a similar inwardly projecting flange 26 at the end of the second end portion 16 to provide means for biasing the end portions 14 and 16 to increase the peripheral circumference of the support strip 12 and means for positioning the overlapped end portions to press the strip of refractory material 13 into engagement with the inner surfaces of the tubes 11. The backing strip 12 is sufficiently flexible to conform to cylindrical or arcuate inner surfaces against which the strip of refractory material 13 is pressed under the influence of the springs 25.

The strip of flexible refractory material 13 is secured on the periphery of the support strip 12 by means comprising a plurality of tongs 27 cut from the support strip 12. The tongs 27 project above the peripheral surface of the support strip 12 and press into and locate the edges of the strip of refractory material 13. Additionally, or alternatively, the means for securing the strip of refractory material 13 could comprise a length of double coated adhesive tape between the support strip 12 and the strip of refractory material 13.

The device 10 also includes a plurality of spaced locating pins 29 which, as is shown in FIGS. 2 and 3, can be removably mounted in sockets 30 staked through the support strip 12 so that the pins 29 will project radially of the support strip 12 through and from positions centrally located between the edges of the strip of refractory material 13. The diameter of the locating pins 29 provides a predetermined spacing between the ends of the tubes 11 to be butt-welded. A trigger pin 32 (shown removed in FIG. 2) has a diameter similar to that of the locating pins 29 and an end 33 removably engageable in two aligned openings of a plurality of openings 34 in the overlapped end portions 14 and 16 of the support strip 12 to retain a predetermined overlapped condition therebetween against the influence of the springs 25.

To use the device 10, an operator attaches to the outer peripheral surface 18 a strip of the refractory material 13 having a length about the same as the inner circumference of the tubes 11 in which the device 10 is to be used. One end of the strips of refractory material 13 is positioned and attached adjacent the flange 20 on the first end portion 14. The operator manually moves the flanges 20 and 26 away from each other against the bias of the springs 25 to appropriately decrease the peripheral circumference of the device 10, and laps the end of the strip of refractory material 13 opposite that attached at the flange 20 outwardly over the attached end.

If the device 10 is to be used without the locating pins 29 or trigger pin 32, the operator manually retains the flanges 20 and 26 while he positions the device 10 through an end of one of the tubes 11 with the strip of refractory material 13 adjacent the adjoining ends of the tubes 11. He then releases the flanges 20 and 26 so that the springs 25 position and press the strip of refractory material 13 in engagement with the inner surfaces of the tubes 11 in a position bridging their adjoining ends.

If the device 10 is to be used with the locating pins 29, the operator presses the end 33 of the trigger pin 32 through the strip of refractory material 13 and two aligned openings 34 in the end portions 14 and 16 to retain the end portions 14 and 16 against the springs 25; and presses locating pins 29 through the strip of refractory material 13 and into the sockets 30. One end of the device 10 is then inserted into the end to be welded of one of the tubes 11 until the pins 29 and 32 engage the end of that tube 11. The end to be welded of the other tube 11 is positioned around the other end of the device 10 until it also engages the pins 29 and 32. With the device 10 thus positioned via the pins 29 and 32 between the ends of two tubes 11, the operator then pulls the trigger pin 32, causing the springs 25 to urge the support strip 12 and thereby the strip of refractory material 13 against the inner surfaces of the tubes 11. The locating pins 29 may then be removed.

The fusion weld can then be made between the ends of the tubes 11. The heat of welding reduces the backing strip to residue similar to coffee grounds. After the weld is complete the device 10 is removed and the residue is brushed from the pipe, leaving the weld with a well-formed, clean inner surface.

FIGS. 4 through 6 illustrate a second embodiment of a device according to the present invention, generally designated by the numeral 36. The device 36 is particularly useful where the lengths of tubes 38 to be butt-welded are such, or the adjoining ends of the tubes to be butt-welded are so positioned or retained that the device 10 may not be manually positioned by either of the methods indicated above.

The device 36 comprises cart means adapted to move axially along the inner surface of tubes 38 to be joined which support a structure similar to that of the device 10 for movement from a first position with a strip of refractory material 40 supported thereon spaced from the inner surface of the tubes 38 in which the cart means is located to afford movement of the cart means through the tubes and positioning of the strip of refractory material 40 adjacent the butted ends of the tubes 30; to a second position with the strip of refractory material 40 pressed against the inner surfaces of the tubes adjacent the butted ends thereof.

Like the device 10, the device 36 comprises a thin, flexible support strip 41 having first and second end portions 42 and 43 respectively which are overlapped to provide an outer peripheral surface 44 on which the strip of refractory material 40 is supported. The terminal end of the first end portion 42 carries a slotted inwardly projecting flange 45 through which the second end portion 43 is slidably retained, and which together with a pair of tabs 46 on the first end portion 42 (which are curved around the edges of the second end portion 43) provide means for guiding the overlapping first and second end portions 42 and 43 for relative sliding movement to change the peripheral circumference of the support strip 41.

A pair of springs 47 are tensioned between the flange 45 and a similar inwardly projecting flange 48 at the end of the second end portion 43 to provide means for biasing the end portions 42 and 43 to increase the peripheral circumference of the support strip 41 and means for positioning the overlapped end portions 42,43 to press the strip of refractory material 13 into engagement with the inner surfaces of the tubes 38.

Like the end portions 14 and 16 of the device 10, the end portions 42 and 43 each have a plurality of spaced openings 49 two of which can be aligned and engaged by a removable pin 50 inserted from inside the support strip 41 to retain a predetermined overlapped condition between the end portions 42 and 43 against the influence of the springs 47.

The cart means comprises a generally rectangular frame 51 having wheels 52 at its corners adapted to contact the inner surface of a tube, and a central section of reduced width about which the support strip 41 is supported. The frame 51 has a threaded socket 53 adapted to receive the end of a rod 54 used in pushing or pulling the device 36 through a tube.

The support strip 41 is supported on the frame 51 by a rectangular movable member 56 attached at one end to one portion of the support strip 41 and slidably mounted in a guide 57 on the frame 51 for movement radially of the support strip 41 to move one portion thereof from a spaced position (FIGS. 4 and 5) with the portion of the strip of refractory material 40 on said one portion of the support strip 41 spaced from the inner surface of tubes 38 in which the device 36 is located, and a contact position with said backing strip portion contacting the inner surface of the tubes 38 (FIG. 6).

A pair of springs 58 are attached between the frame 51 and the ends of a shaft 59 fixed to the movable member 56 and guided for sliding movement in slots in the guide 57. The springs 58 provide means for biasing the movable member toward the contact position. A pin 60 engageable through a hole in a projection 61 on the movable member 56 which projects through an opening in the guide 57 when said portion of the strip of refractory material 41 is in its spaced position provides means for releasably retaining it there.

A support arm 63 is fixed to the guide 57 and has ends each with two projecting fingers 64 spaced to slidably engage opposite edges of the support strip 41 to position the same while allowing movement thereof between the fingers 64 to afford relative sliding movement of the end portions 42 and 43 and corresponding changes in the peripheral circumference of the support strip 41.

To use the device 36, an operator spreads the flanges 45 and 48 against the bias of the springs 47 to a desired circumference for the support strip 41 which will permit free movement of a strip of refractory material 40 thereabout through the tubes 38 in which the device 36 is to be used, and then inserts the pin 50 in a pair of aligned holes in the overlapped end portions 42 and 43 to retain the desired circumference. Also, the operator moves the movable member 56 to the spaced position for the refractory material 40 and retains it there by inserting the pin 60 in the projection 61.

Next, a strip of refractory material 40 of the desired length is attached on the periphery of the support strip 41 with the ends of the strip of refractory material 40 overlapped at the juncture between the end portions 42 and 43 of the support strip 41 (See FIG. 4).

The device 36 is then pushed into the tubes 38 via the rod 54 which may be calibrated or marked to show the proper positioning for the device 36 axially along the tube to position the strip of refractory material 40 adjacent the abutted ends of the tubes 38 to be welded together.

After such positioning is achieved the operator pulls a cord 66 which is attached to the pins 50 and 60 to first pull the pin 60 and allow the movable member 56 to move the refractory material 40 to the contact position, and then to pull the pin 50 to allow the springs 47 to expand the support strip 41 and press the strip of refractory material 40 into engagement with the butted ends of the tubes 38. The tubes 38 can then be welded.

Where the device 36 is to be used in vertical or almost vertical tubes, the frame may also include removable projections 67 (shown in dotted outline in FIG. 5), each of which slidably supports a castor wheel 68 outwardly biased by a spring 69. The castor wheels 68 provide means for maintaining the wheels 52 against the inner surface of a vertical or almost vertical tube in which the device 36 is positioned, while the spring mounting of the castor wheels 68 affords movement of the device 36 over irregularities in the tube.

Figure 7:
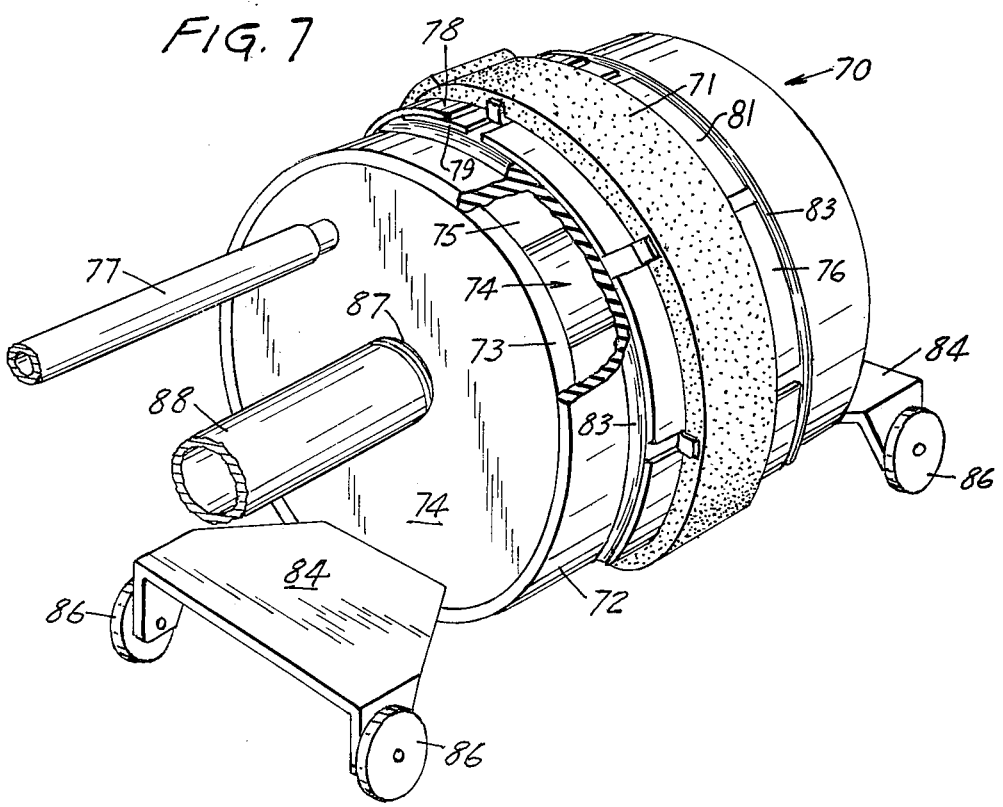
FIG. 7 is a perspective view with parts broken away to show detail of a third alternate embodiment of the device according to the present invention.

FIG. 7 illustrates yet a third embodiment of a device according to the present invention, generally designated by the numeral 70, which like the device 36 is particularly useful in situations where the device 10 may not be manually positioned at the adjoining ends of tubes to be welded.

Like the device 36, the device 70 comprises cart means adapted to move axially along the inner surface of tubes to be joined, which cart means supports a structure for moving a backing strip of refractory material 71 from a first position with the strip of refractory material 71 spaced from the inner surface of the tubes in which the cart means is located to afford movement of the cart means through the tubes and positioning of the strip of refractory material 71 adjacent the butted ends of the tubes; to a second position with the strip of refractory material 71 pressed against the inner surfaces of the tubes adjacent the butted ends thereof.

The structure for moving the strip of refractory material 71 from its first to its second position comprises a resilient elastic generally cylindrical member 72 (e.g., rubber) having its ends in air tight engagement with the outer edges of a pair of spaced flanges 73 on a ridged spool-like support 74. The space between the resilient cylindrical member 72 and the spool-like support 74 provides a chamber 75 which may be coupled to a source of air under greater than atmospheric pressure through an inlet hose 77 to expand the resilient cylindrical member 72 and thereby increase its peripheral circumference. A device having a structure similar to the combination of the spool-like support 74 and the elastic cylindrical member 72 is commercially available in various sizes from Cherne Industrial, Inc., 5701 South County Road 18, Edina, Minn., 55436, as the "Muni-Ball Plug."

A thin, flexible, resilient, spring metal support strip 76 is disposed about the resilient cylindrical member 72. The support strip 76 has first and second end portions 78 and 79 respectively which are overlapped to provide a variable length outer peripheral surface 81 on which the backing strip 71 is supported. The support strip 76 is retained against axial movement axially along the cylindrical member 72 by annular ridges 83 on the cylindrical member 72 flanking the support strip 76.

The support strip 76 provides a heat barrier between the strip of refractory material 71 and the cylindrical member (which barrier may be increased by an asbestos layer on the inner surface of the support strip 76 if necessary) and its use also prevents separation of the friable strip of refractory material 71.

The support strip 76 has spring temper biasing its end portions 78 and 79 toward a greater overlapped condition to retain the support strip 76 around the cylindrical member 72 when the cylindrical member 72 contracts upon release of air pressure from within the chamber 75.

The cart means comprises the spool-like support member 74, and two frame members 84 projecting from opposite ends thereof on which are rotatably mounted wheels 86 adapted to contact the inner surface of a tube in which the device 70 is used. One end of the spool-like support member 74 has a central threaded socket 87 adapted to receive the end of a rod 88 used in pushing or pulling the device 70 through a tube.

To use the device 70, an operator attaches a strip of refractory material 71 of the desired length on the periphery of the support strip 76 (as by double coated adhesive tape) with the ends of the strip of refractory material 71 overlapped at the juncture between the end portions 78 and 79 of the support strip 76.

Next the device 70 is pushed into the tube via the rod 88 which may be calibrated or marked to show the proper positioning for the device 70 axially along the tube to position the strip of refractory material 71 adjacent the abutted ends of the tubes to be welded together.

After such positioning is achieved the operator applies air under greater than atmospheric pressure through the hose 77 to move the strip of refractory material 71 to its second position and position it in engagement with the inner surface of the tubes. The tubes can then be welded.

Where the device 70 is to be used in vertical or almost vertical tubes, it may also utilize removable projections like the projections 67 for the device 36 to center it in the tubes.

I claim:

1. A backing device useful during fusion butt-welding between the ends of two tubular members having similar curvilinear inner surfaces, said device comprising:
   a thin flexible support strip having overlapped end portions to provide an arcuate outer peripheral surface;
   means guiding said overlapping end portions for relative longitudinal sliding movement to change the peripheral circumference of said support strip;
   a strip of flexible refractory material comprising inorganic particles bound together with a flexible organic binder adapted to have a length dimension which is about the same as that of the inner circumference of the tubular members;
   means for securing said strip of refractory material on the periphery of said support strip; and
   means adapted for positioning said end portions to press said strip of refractory material into engagement with the inner surfaces of said butted tubes.

2. A backing device according to claim 1, wherein said means adapted for positioning said end portions to press said strip of refractory material into engagement with the inner surfaces of said butted tubes comprises biasing means for biasing said end portions to increase the peripheral circumference of said support strip.

3. A device according to claim 2, wherein said end portions each have openings adapted to align upon movement of said end portions to predetermined relative positions in opposition to said biasing means, and said device comprises:
- a trigger pin having an end adapted to releasably engage said aligned openings and retain said end portions in a predetermined position in opposition to said biasing means;
- a plurality of locating pins; and
- means for removably mounting said locating pins in spaced relationship to project radially from said support strip through and about centrally between the edges of said strip of refractory material.

4. A device according to claim 1, wherein said device includes cart means adapted for moving axially along the inner surface of said tubes, and said means adapted for positioning said end portions comprises:
- support means supporting said support strip on said cart means for movement from a first position with said strip of refractory material spaced from the inner surfaces of tubes in which the cart means is located to afford movement of the cart through the tubes, to a second position with the strip of refractory material pressed against the inner surfaces of said tubes adjacent the butted ends thereof; and
- means for moving said support means to the second position.

5. A device according to claim 4, wherein said support means comprises a resilient elastic generally cylindrical member supporting the surface of said support strip opposite the refractory strip, and means for applying fluid under greater than atmospheric pressure against the surface of said cylindrical member opposite said support strip to provide said means for moving said support means from said first to said second position.

6. A backing device according to claim 4, wherein: said means adapted for positioning said end portions to press said strip of refractory material into engagement with the inner surfaces of said butted tubes comprises biasing means for biasing said end portions to increase the peripheral circumference of said support strip; said support means comprises retaining means for releasably retaining said end portions in a position with the periphery of the strip of refractory material around the support strip substantially smaller in length than the inner circumferential surface of the tube, and a movable member attached to one portion of said support strip and mounted on said cart means for movement generally radially of said support strip to move said one portion of said support strip from a spaced position with the portion of said strip of refractory material on said one portion of the backing strip spaced from the inner surface of the tubes, and a contact position with said portion of the strip of refractory material contacting the inner surface of the tubes, means for biasing said movable member toward said contact position, and means for releasably retaining said movable member in said spaced position; said support strip being in said first position when said support ring is retained by said retaining means and said support member is in said spaced position, and said support strip being in said second position when said support member is in said contact position and said retaining means is released.

* * * * *

UNITED STATES PATENT AND TRADEMARK OFFICE
CERTIFICATE OF CORRECTION

PATENT NO. : 3,940,048
DATED : February 24, 1976
INVENTOR(S) : James H. Casey

It is certified that error appears in the above-identified patent and that said Letters Patent are hereby corrected as shown below:

Column 1, line 51, change "3,378,852" to -- 3,372,852 --; and line 67, change "3,378,852" to -- 3,372,852 --.

Column 2, line 10, change "3,378,852" to -- 3,372,852 --.

Column 3, line 67, change "3,378,852" to -- 3,372,852 --.

Column 4, line 62, change "strips" to -- strip --.

Signed and Sealed this

Thirteenth Day of July 1976

[SEAL]

Attest:

RUTH C. MASON
Attesting Officer

C. MARSHALL DANN
Commissioner of Patents and Trademarks